(12) United States Patent
Campbell et al.

(10) Patent No.: US 10,196,270 B2
(45) Date of Patent: Feb. 5, 2019

(54) CONVERSION OF ADDITIVELY MANUFACTURED ORGANIC POLYMER PARTS TO SUBSTANTIALLY PURE CARBON

(71) Applicant: Lawrence Livermore National Security, LLC, Livermore, CA (US)

(72) Inventors: Patrick Campbell, Oakland, CA (US); Theodore F. Baumann, Discovery Bay, CA (US); Juergen Biener, San Leandro, CA (US); Swetha Chandrasekaran, Dublin, CA (US); James S. Oakdale, Castro Valley, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 79 days.

(21) Appl. No.: 15/208,501

(22) Filed: Jul. 12, 2016

(65) Prior Publication Data

US 2018/0016145 A1 Jan. 18, 2018

(51) Int. Cl.
*C01B 32/05* (2017.01)
*B01J 13/00* (2006.01)

(52) U.S. Cl.
CPC ........... *C01B 32/05* (2017.08); *B01J 13/0091* (2013.01); *C01P 2006/40* (2013.01)

(58) Field of Classification Search
CPC .......... B01J 23/74; C04B 35/532; B28B 1/00; B29C 67/00; B24B 37/22
USPC .......................................................... 428/114
See application file for complete search history.

(56) References Cited

U.S. PATENT DOCUMENTS

| 8,613,204 | B2 | 12/2013 | Farmer | |
|---|---|---|---|---|
| 9,091,466 | B2 | 7/2015 | Farmer | |
| 2009/0197038 | A1* | 8/2009 | Wang | B01J 23/74 428/114 |
| 2011/0100036 | A1 | 5/2011 | Farmer | |
| 2014/0060093 | A1 | 3/2014 | Farmer | |
| 2016/0325464 | A1* | 11/2016 | Albers | C04B 35/532 |

OTHER PUBLICATIONS

Zhu, C et al., "Highly compressible 3D periodic graphene aerogel microlattices," Nature Communications, 2015, pp. 1-8.
(Continued)

*Primary Examiner* — Khanh T Nguyen
(74) *Attorney, Agent, or Firm* — Zilka-Kotab

(57) ABSTRACT

In one embodiment, a method includes creating a three-dimensional, carbon-containing structure using an additive manufacturing technique and converting the three-dimensional, carbon-containing structure to a substantially pure carbon structure. Moreover, the substantially pure carbon structure has an average feature diameter of less than about 100 nm. In another embodiment, a product includes a substantially pure carbon structure having an average feature diameter of less than about 100 nm. In yet another embodiment, a product includes an aerogel having inner channels corresponding to outer walls of a three-dimensional printed template around which the aerogel was formed. In addition, the inner channels have an average feature diameter of less than about 100 nm.

19 Claims, 7 Drawing Sheets

(56) References Cited

OTHER PUBLICATIONS

Lim, Y. et al., "Monolithic carbon structures including suspended single nanowires and nanomeshes as a sensor platform," Nanoscale Research Letters, 2013, vol. 8, No. 1, pp. 1-9.

Bauer, J. et al., "Approaching theoretical strength in glassy carbon nonlattices," Nature Materials, Apr. 2016, vol. 15, pp. 438-443.

Bauer, J. et al., "High-stength cellular ceramic composites wih 3D microarcitecture," Proceedings of the National Academy of Sciences, Feb. 18, 2014, vol. 111, No. 7, pp. 2453-2458.

Wu, Z-S. et al., "Three-Dimensional Graphene-based Macro- and Mesoporous Frameworks for High Performance Electrochemical Capacitive Energy Storage," Journal of the American Chemica Society, 2012, vol. 134, No. 48, pp. 19532-19535.

U.S. Appl. No. 61/256,243, filed Oct. 29, 2009.

Baumann, T. et al., "Template-directed synthesis of periodic macroporous organic and carbon aerogels," Journal of Non-Crystalline Solids, 2004, vol. 350, No. 15, pp. 120-125.

Ye, S. et al., "A rapid synthesis of high aspect ratio copper nonowires or high-performance transparent conducting films," Chem. Comm., 2014, vol. 50, pp. 2562-2564.

Tang, Y., et al., "Ultralow-Density Copper Nanowire Aerogel Monoliths with Tunable Mechanical and Electrical Properties," Journal of Materials Chemistry, The Royal Society of Chemistry, 2013, vol. 1, pp. 6723-6726.

Akbulut, O. et al., "Separation of Nanoparticles in Aqueous Multiphase Systems through Centrifugation," Nano Letters, 2012, vol. 12, No. 8, pp. 4060-4064.

Jarrett, R. et al., "Silver nanowire purification and separation by size and shape using multi-pass filtration," Materials Research Innovations, vol. 20, No. 2, pp. 86-91.

Raciti, D. et al., "Highly Dense Cu Nanowires for Low-Overpotential $CO_2$ Reduction," Nano Letters, American Chemical Society, 2015, vol. 15, pp. 6829-6835.

Pradel, K. et al., "Cross-Flow Purification of Nanowires," Agnew. Chem. Int., 2011, vol. 50, pp. 3412-3416.

Jung, S. et al., "Porous Cu Nanowire Aerosponges from One-Step Assembly and their Applications in Heat Dissipation," Adv. Materials, 2016, vol. 28, pp. 1413-1419.

\* cited by examiner

|  | TPP | TPP after carbon |
| --- | --- | --- |
| Diameter of part | 1.5 mm | 0.25 mm |
| Block dimension | ~90 μm | ~13-14 μm |
| Line width | ~500-600 nm | ~220 nm |
| Pitch | ~2.7 μm | ~440 nm |

FIG. 4

|  | PμSL | PμSL after carbon |
|---|---|---|
| Dimensions of part | 1.7 x 0.8 mm | 470 x 250 μm |
| Line width | ~43 μm | ~6-7 μm |
| Unit cell size | ~105 μm | ~35 μm |

FIG. 6

CONVERSION OF ADDITIVELY MANUFACTURED ORGANIC POLYMER PARTS TO SUBSTANTIALLY PURE CARBON

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to carbonized 3D printed parts, and more particularly, this invention relates to converting additively manufactured organic polymer parts to pure carbon with retention of designed structure.

BACKGROUND

Additive manufacturing techniques such as projection micro-stereolithography (PμSL) and NanoScribe (NS) printing can produce three-dimensional (3D) printed parts of overall part dimensions up to centimeters in size and with feature sizes that range from the tens to hundreds of microns. However, these techniques are based on photopolymerization of liquid resins to make solid polymer parts which are generally non-conductive and have relatively poor mechanical properties.

For some modern applications, there may be a desire to create 3D printed parts with the size characteristics of nanoscale features on centimeter size parts that are conductive and have improved mechanical properties.

SUMMARY

In one embodiment, a method includes creating a three-dimensional, carbon-containing structure using an additive manufacturing technique and converting the three-dimensional, carbon-containing structure to a substantially pure carbon structure. Moreover, the substantially pure carbon structure has an average feature diameter of less than about 100 nm. In another embodiment, a product includes a substantially pure carbon structure having an average feature diameter of less than about 100 nm. In yet another embodiment, a product includes an aerogel having inner channels corresponding to outer walls of a three-dimensional printed template around which the aerogel was formed. In addition, the inner channels have an average feature diameter of less than about 100 nm.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 4 is a table of structure dimensions according to one embodiment.

FIG. 6 is a table of structure dimensions according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of carbonized 3D printed parts and/or related systems and methods.

In one general embodiment, a method includes creating a three-dimensional, carbon-containing structure using an additive manufacturing technique and converting the three-dimensional, carbon-containing structure to a substantially pure carbon structure. Moreover, the substantially pure carbon structure has an average feature diameter of less than about 100 nm.

In another general embodiment, a product includes a substantially pure carbon structure having an average feature diameter of less than about 100 nm.

In yet another general embodiment, a product includes an aerogel having inner channels corresponding to outer walls of a three-dimensional printed template around which the aerogel was formed. In addition, the inner channels have an average feature diameter of less than about 100 nm.

A list of acronyms used in the description is provided below.

3D three dimensional
AM additive manufacturing
CA carbon aerogel
DiLL dip-in laser lithography
DLW direct laser writing
HDDA hexanediol diacrylate
IP-DIP NanoScribe's proprietary resist
ITO indium tin oxide LA-PµSL large area projection micro stereo lithography
LLNL Lawrence Livermore National Laboratory
NS NanoScribe
PEGDA polyethylene glycol diacrylate
PµSL projection micro-stereolithography
RF resorcinol-formaldehyde
TPP two-photon polymerization
UV ultraviolet There is a need to improve the mechanical properties of three dimensional printed parts, to reduce their feature size beyond current additive manufacturing (AM) resolution limitations, and make them conductive. The presently disclosed inventive concepts include a process for converting additive manufactured organic polymer parts to pure carbon while improving their mechanical properties, retaining the printed structure, and reducing feature size.

Figure 1:
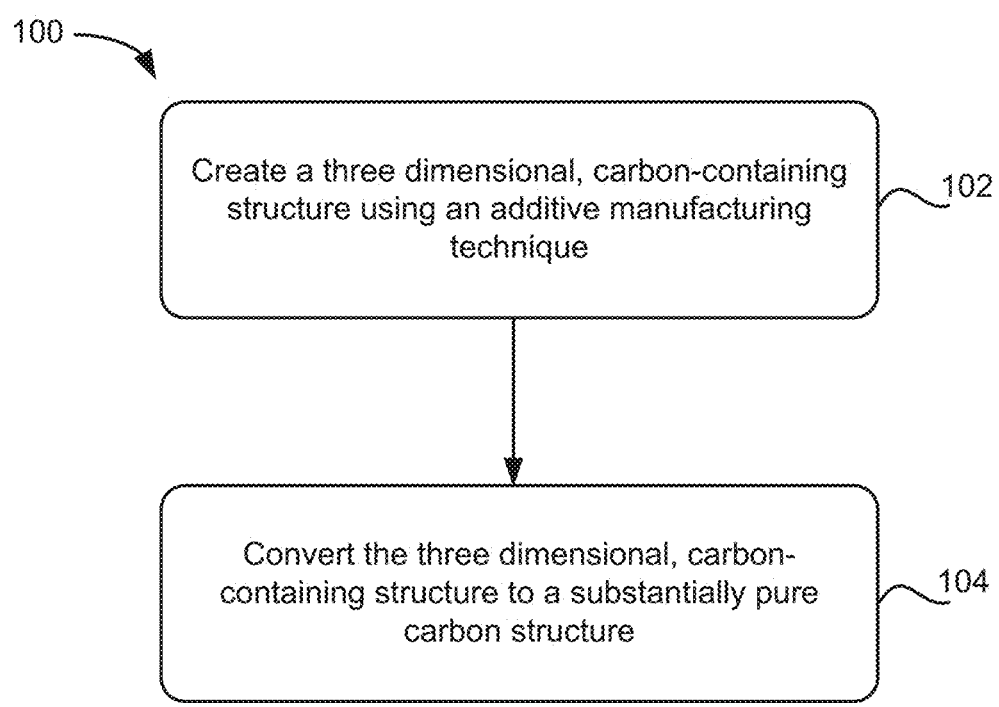
FIG. 1 is a flowchart of a method for forming a three-dimensional (3D), substantially pure carbon structure, according to one embodiment.

FIG. 1 shows a method 100 for creating a carbonized 3D printed structure, in accordance with one embodiment. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

An exemplary method for creating macro-sized, mechanically robust and conductive parts with nano-sized features is provided in detail below according to one embodiment. This method may provide benefits in the fields of energy storages, catalysis, and more.

Step 102 of method 100, as illustrated in FIG. 1, includes creating a three-dimensional (3D), carbon-containing structure using an additive manufacturing technique. In some embodiments, the additive manufacturing technique used to create a 3D, carbon-containing structure may include, but not limited to the following, projection micro-stereolithography (PµSL), large area PµSL (LA-PµSL), two-photon polymerization, two-photon de-polymerization, direct laser writing, etc.

In some approaches, step 102 of method 100 (see FIG. 1) a 3D, carbon-containing structure may be created using "carbon-rich" chemicals or resin based on aromatic sub-units, for example, using polyethylene glycol diacrylate (PEGDA), hexanediol diacrylate (HDDA), etc, or acrylic-based resin as used in NanoScribe printing, or unsaturated subunits, etc. The resulting carbon-containing polymer can facilitate graphitization.

In a preferred embodiment, the 3D, carbon-containing polymer part of step 102 of method 100 may be a complex structure of several centimeters or millimeters in overall size with micrometer or nanometer size features. Features of the polymer part include the smallest dimensions of a part, for example, strut diameter, line width, pitch, pores within the struts, etc. Dimensions of overall footprint of a 3D polymer complex structure may include edge length, diameter of the part, block dimension, unit cell size, dimensions of the part, etc.

Step 104 of method 100 (as shown in FIG. 1) includes converting the 3D carbon-containing structure to a substantially pure carbon structure where the substantially pure carbon structure may have an average feature diameter of less than about 100 nm. In an exemplary embodiment, a substantially pure carbon structure may contain at least 95% pure carbon, and preferably 98% pure carbon, but the percentage of pure carbon in the converted structure may be higher or lower. Of note, the inventors expect the substantially pure carbon structure to be either amorphous or glassy carbon. The carbon in the substantially pure carbon structure is preferably graphitic thus may provide good thermal and electrical conductivity.

With continued reference to FIG. 1, according to a preferred embodiment, step 104 may involve heating the 3D, carbon-containing structure in an inert atmosphere, for example, nitrogen.

In some approaches, heating the 3D, carbon-containing polymer part in an inert atmosphere at a pressure between vacuum and 150 kPa, e.g., at standard pressure, may be performed in a sequence of steps. For example, the 3D, carbon-containing polymer part may be heated in an inert atmosphere in a sequence of steps in which each step may include heating to a predefined temperature at a selected heating rate, and holding at the predefined temperature for a selected period of time. For example, holding at 250° C. for 45 minutes.

In one embodiment, thermal conversion of a 3D, carbon-containing polymer part to a pure carbon structure in an inert atmosphere while retaining proportionality with the original polymer part may include a sequence of steps. In some approaches, the sequence may include at least two steps of heating to a predefined temperature at a selected heating rate, and holding at the predefined temperature for a selected period of time, for example, heating to 250° C. and holding for 45 minutes, and then heating to 350° C. and holding for 60 minutes. In other approaches, the sequence of steps may include at least three steps of heating to a predefined temperature at a selected heating rate, and holding at the predefined temperature for a selected period of time, for example, heating to 250° C. and holding for 45 minutes, and then heating to 350° C. and holding for 60 minutes, and then heating to 600° C. and holding for 60 minutes. In yet other approaches, the sequence of steps may include at least four steps of heating to a predefined temperature at a selected heating rate, and holding at the predefined temperature for a selected period of time, for example, heating to 250° C. and holding for 45 minutes, and then heating to 350° C. and holding for 60 minutes, and then heating to 600° C. and holding for 60 minutes, and then heating to 900° C. and holding for 60 minutes, and continued heating and holding for as many steps as indicated.

In one embodiment, each heating step in an inert atmosphere in the sequence of steps may include a heating rate between holding temperatures that is greater than 1° C./minute and less than 6° C./minute.

In one embodiment, the maximum temperature reached during thermal conversion in an inert atmosphere of the 3D, carbon-containing polymer part to the substantially pure carbon structure may be greater than 800° C., and preferably about 900° C.

In some approaches, the sequence of steps to thermally convert in an inert atmosphere the 3D, carbon-containing polymer part to the substantially pure carbon structure may include a final cooling step of a decreasing heating rate of less than 4° C./minute.

According to another embodiment, with continued reference to FIG. 1, step 104 may involve heating the 3D, carbon-containing structure in a vacuum, for example, vacuum furnace conditions.

In some approaches, heating the 3D, carbon-containing polymer part in a vacuum may be performed in a sequence of steps. For example, the 3D, carbon-containing polymer part may be heated in a vacuum in a sequence of steps in which each step may include heating to a predefined temperature at a selected heating rate, and holding at the predefined temperature for a selected period of time. For example, holding at 250° C. for 45 minutes.

In one embodiment, thermal conversion of a 3D, carbon-containing polymer part to a pure carbon structure in a vacuum while retaining proportionality with the original polymer part may include a sequence of steps. In some approaches, the sequence may include at least two steps of heating to a predefined temperature at a selected heating rate, and holding at the predefined temperature for a selected period of time, for example, heating to 250° C. and holding for 45 minutes, and then heating to 350° C. and holding for 60 minutes. In other approaches, the sequence of steps may include at least three steps of heating to a predefined temperature at a selected heating rate, and holding at the predefined temperature for a selected period of time, for example, heating to 250° C. and holding for 45 minutes, and then heating to 350° C. and holding for 60 minutes, and then heating to 600° C. and holding for 60 minutes. In yet other approaches, the sequence of steps may include at least four steps of heating to a predefined temperature at a selected heating rate, and holding at the predefined temperature for a selected period of time, for example, heating to 250° C. and holding for 45 minutes, and then heating to 350° C. and holding for 60 minutes, and then heating to 600° C. and holding for 60 minutes, and then heating to 900° C. and holding for 60 minutes, and continued heating and holding for as many steps as indicated.

In one embodiment, the heating sequence of steps in a vacuum may include a heating rate between holding temps that is less than 6° C./minute.

In one embodiment, the maximum temperature reached during thermal conversion in a vacuum of the 3D, carbon-containing polymer part to the substantially pure carbon part may be greater than 800° C., and preferably about 900° C.

In some approaches, the sequence of steps to thermally convert in a vacuum the 3D, carbon-containing polymer part to the substantially pure carbon may include a final cooling step of a decreasing heating rate of less than 4° C./minute.

In one embodiment, the method 100 of FIG. 1 may create a substantially pure carbon structure that has an edge and/or a diameter of at least 1 mm in length.

In another embodiment, the method 100 of FIG. 1 may create a substantially pure carbon structure that has an edge and/or a diameter of at least 1 cm in length and has maximum edge and/or diameter that may be as large as the tooling being used permits.

According to a preferred embodiment, method 100 of FIG. 1 creates a substantially pure carbon structure that is electrically conductive.

In some approaches, the heating sequence of steps may shrink the 3D, carbon-containing structure to a substantially pure carbon structure that may be less than 20% of original size of the 3D, carbon-containing structure prior to converting to carbon.

In other approaches, the substantially pure carbon structure may retain the same proportions as the 3D, carbon-containing structure had prior to the converting. For example, the length-to-width ratio of substantially pure carbon structure remains the same as the length-to-width ratio of the 3D, carbon-containing structure prior to thermal conversion. In other words, the shrinkage of the 3D, carbon-containing structure is isotropic in terms of shrinking in all directions to the same proportions.

According to another embodiment, a product may be created that may be a substantially pure carbon structure that may have an average feature diameter of less than about 100 nm and greater than 0 nm. In some approaches, the overall size of the 3D substantially pure carbon structure may have an edge and/or a diameter of at least 1 mm in length. In other approaches, the substantially pure carbon structure may have an edge and/or a diameter of at least 1 cm in length.

In a preferred embodiment, the substantially pure carbon structure may be electrically conductive.

In some approaches, the substantially pure carbon structure may be less than 20% of original size of 3D, carbon-containing structure.

Without wishing to be bound by any theory, the inventors believe that the 3D, substantially pure carbon structure will be mechanically stronger than the original 3D polymer part before carbonization. Thus, complex 3D parts, for example octet trusses, converted to a substantially pure carbon octet truss may provide ultra nano-scale structural material.

In further embodiments, the method described herein may convert polymers via heat treatment, or post processing to yield doped carbons (e.g. nitrogen-doped carbon, boron-doped carbon, or sulfur-doped carbon), or carbides (e.g. silicon carbide, tantalum carbide, zirconium carbide, etc), carbonitrides, or even nitrides (e.g. boron nitride).

In use, the electrically conductive 3D, substantially pure carbon structures with small feature sizes may be useful in electrical energy storage applications, for example, super capacitors, Li+ ion batteries, flow batteries, etc. Moreover, the 3D carbon structures described herein may be useful in catalysis applications, for example, fuel cells, electrocatalysts, etc. Furthemore, 3D carbon structures described herein may be useful in micro-structural support materials and may provide high temperature stability to AM parts. The proportional shrinking of features on the 3D carbon structures described herein might provide optimal control of density profiles of structures, for example applications at the National Ignition Facility, Omega Laser System, etc.

Aerogel Formation

Additive manufacturing and aerogels from sol-gel chemistry may be combined to create 3D micro porous interconnected channels in an aerogel. Thus 3D substantially pure carbon structures may be employed as templates to fabricate aerogels with defined pore geometries. Physical characteristics, for example, larger pore size, of the aerogel may be defined by the 3D substantially pure carbon template in which the resulting 3D aerogel structure with defined pore geometries may or may not include the 3D substantially pure carbon template.

In one embodiment a 3D aerogel may be created that has inner channels corresponding to outer walls of a 3D substantially pure carbon template around which the aerogel was formed, where the template is a substantially pure carbon structure with an average feature diameter of less than about 100 nm. In some approaches, the template may remain in the product. In other approaches, the template may not be present in the final product, e.g., the template has been removed.

In a preferred embodiment, the gaps of the 3D substantially pure carbon template may be infilled with an aerogel precursor solution that may involve creating aerogels using organic sol-gel chemistry. Any known aerogel precursor solution may be used. In some approaches, sol-gel chemistry may involve a resorcinol-formaldehyde (RF) solution or metal oxide aerogel precursors, for example, metal dichalcogenide aerogels.

In some approaches, the resultant structure ay be a 3D carbon aerogel structure in which the aerogel may be carbonaceous, and in some approaches, the template may be removed thereby allowing open channels where the template was originally positioned.

In other approaches, the aerogel of the resultant structure may include a metal oxide. Creating aerogels using sol-gel chemistry may involve metal oxide aerogel precursors, e.g. known metal oxide aerogel precursors such as metal alkoxides. For example, a metal oxide aerogel may be created by epoxide-assisted sol gel chemistry using an alcoholic solution (e.g. ethanol, methanol, etc.) of metal salt, such as metal chlorides or nitrates (e.g. iron nitrate, aluminum chloride, lanthanum nitrate, etc.)

Moreover, in another embodiment, the aerogel may have distinct regions with different densities upon removal of the template therefrom. In yet another embodiment, the structure may be continuous thereby allowing a continuous channel through porous material (e.g. the carbon aerogel). In further embodiments, the aerogel may have anisotropic channels that may allow for directing mass transport through the nanoporous aerogel infill.

In one embodiment, the template may be present in the product such that the 3D substantially pure carbon template may coexist with the aerogel.

In the embodiments included herein, various additive manufacturing technologies with thermal conversion of the 3D structures into substantially pure carbon 3D templates may be combined to create one aerogel structure with reduced feature size. The sol-gel process may be employed to create infill aerogels with tunable composition and structure on the nanometer scale.

In use, the aerogel with the electrically conductive 3D template may be useful in applications that require low density and high porosity material that is also mechanically robust, for example, batteries with improved charge transfer through the aerogel, supercapacitors, catalyst support, catalyst, polymer composites, and sensors. In addition, aerogels with electrically conductive 3D templates may improve mechanical performance for structural applications by incorporating an ultra-high surface area component with a high mechanical strength network. Moreover, the methods described herein may facilitate tuning the density of bulk material and combining multiple materials (e.g. carbon and metal oxide) in the same porous bulk material for catalysts of electrocatalysts.

Experimental Example

Step 1: Create a 3D, Carbon-containing Structure

Two-photon Polymerization

The inventors used a NanoScribe DLW machine to create a 3D printed template in the form of disks at 100 μm thick and 1.5 mm in. Each disk in the experiment was a hierarchical series of structures comprising over 1,500 individually printed 100×100×16 μm$^3$ blocks layered in a running brickwork pattern. Each block had a log-pile architecture, i.e., a series of stacked linear lines. The direct laser written lines had about a 3-to-1 (width) aspect oval shape that was fixed by the nature of TPP. The width of the voxel was adjusted by tuning the laser power, but was fixed to approximately 600 nm.

The inventors used NanoScribe's proprietary resist, IP-DIP, an acrylic-based resin of (greater than 75%) of pentaerythritol triacrylate to create the, 3D printed templates. Printing was carried out up-side-down onto indium tin oxide (ITO)-coated glass slides by dip-in laser lithography (DiLL) mode. Following removal of residual resist with propylene glycol monomethyl ether, structures were immersed in an isopropanol bath containing 1 wt % irgacure 651 and post-cure under 365 nm UV light for a period of 0.5 hours. The 3D printed template structures were then allowed to air dry. Removal of the 3D printed template structures from the glass slides were carried out by either dissolving the ITO layer with Zn/HCL rinse, or using a razor blade to wedge the 3D printed template structures from the substrate.

Projection Micro-stereolithography

The inventors conducted experiments in which they fabricated 3D lattice structures (octet truss) on the PμSL (1.7×0.8 mm×43 μm line width, 105 μm unit cell) and LA-PμSL.

Step 2: Convert the 3D, Carbon-containing Structure to a Substantially Pure Carbon Structure The inventors thermally converted the 3D printed polymer parts to pure carbon following each of the approaches described for step 104 of the exemplary method (method 100, see FIG. 1) described herein.

Heating in a Vacuum

Figure 2A:
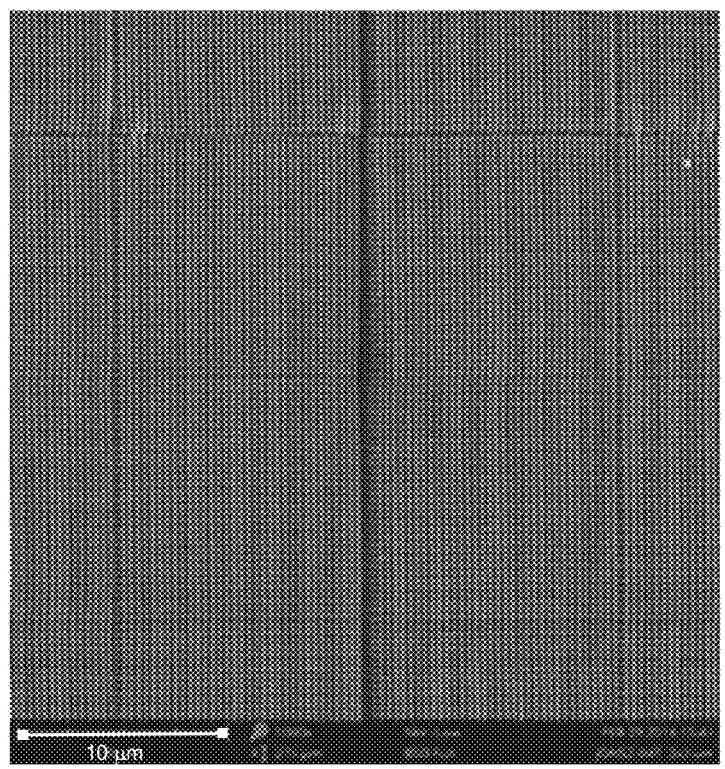
FIG. 2A is a scanning electron micrograph of a 3D, carbon-containing polymer part created by TPP printing according to one embodiment.
Figure 2B:
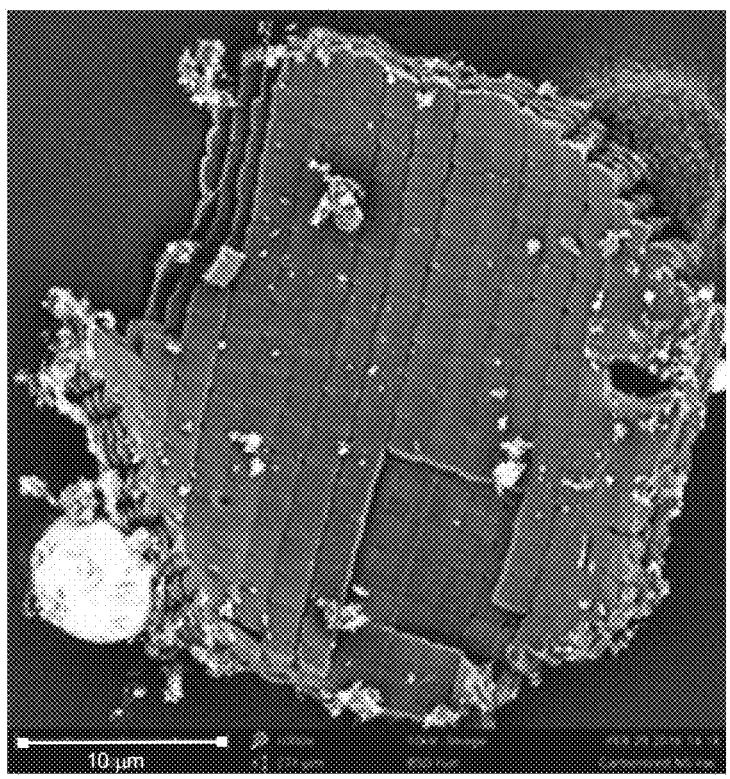
FIG. 2B is a scanning electron micrograph of a 3D, substantially pure carbon structure according to one embodiment.
Figure 3A:
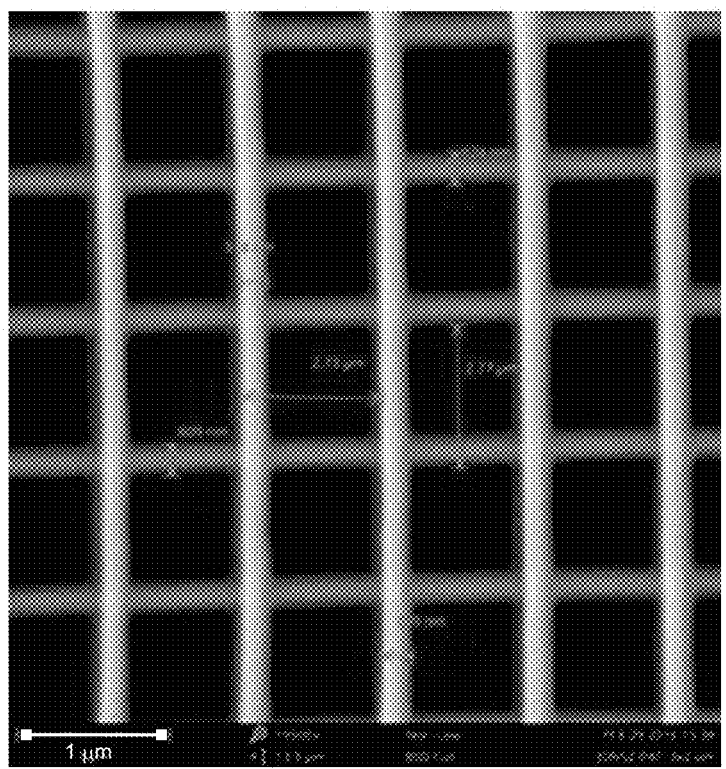
FIG. 3A is a scanning electron micrograph of a 3D, carbon-containing polymer part created by TPP printing according to one embodiment.
Figure 3B:
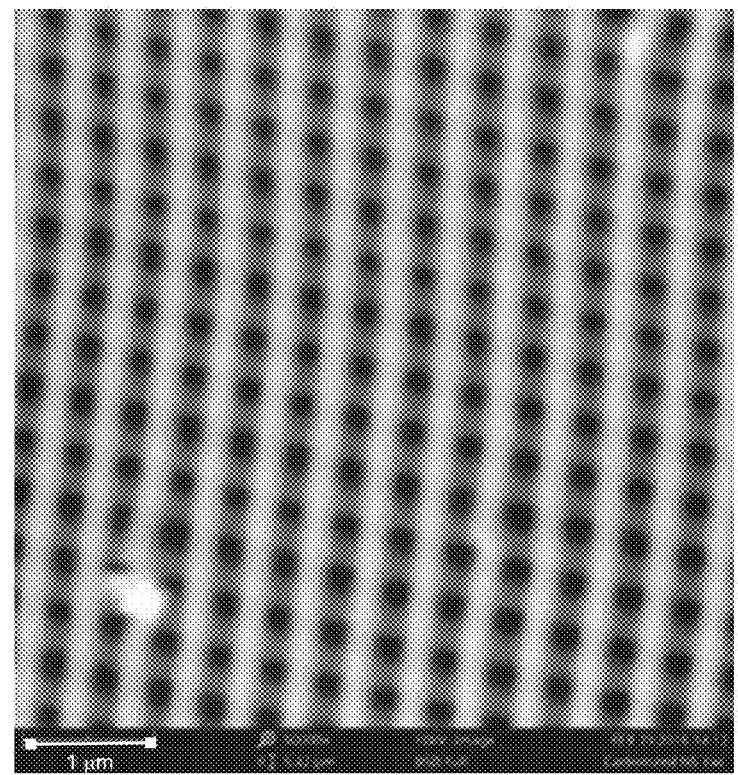
FIG. 3B is a scanning electron micrograph of a 3D, substantially pure carbon structure according to one embodiment.

Stepwise heating under vacuum furnace conditions at 10-6 torr of pressure:
1) Heated to 250° C. using a heating rate of 5° C./minute, held for 45 minutes,
2) Heated to 350° C. using a heating rate of 3° C./minute, held for 60 minutes.
3) Heated to 600° C. using a heating rate of 3° C./minute, held for 60 minutes,
4) Heated to 900° C. using a heating rate of 3° C./minute, held for 60 minutes,
5) Slowly cooled down at a heating rate of 2° C./minute Heating in an Inert Atmosphere Stepwise heating in an inert atmosphere (flowing nitrogen) at standard pressure:
1) Heated to 250° C. using a heating rate of 5° C./minute, held for 45 minutes,
2) Heated to 350° C. using a heating rate of 3° C./minute, held for 60 minutes,
3) Heated to 600° C. using a heating rate of 3° C./minute, held for 60 minutes,
4) Heated to 900° C. using a heating rate of 3° C./minute, held for 60 minutes,
5) Slowly cooled down to 20° C. at a heating rate of 2° C./minute Results Two-photon Polymerization The 3D, substantially pure carbon parts created using TPP are illustrated in FIGS. 2A-B and. FIGS. 3A-B. FIG. 2A shows the scanning electron micrograph (SEM) image (at relative resolution of 10 μm) of a 3D, carbon-containing polymer part created using TPP by NanoScribe printing. FIG. 2B shows an SEM image of the thermally converted version of the now 3D, substantially pure carbon structure at the same resolution (relative 10 μm). The structure appears to retain the similar grid ratio (FIG. 2B) in at a size that appears significantly shrunken from the original size of the carbon-containing polymer (FIG. 2A).

FIG. 3A is a SEM image of a 3D, carbon-containing polymer created using TPP in a log-pile formation at a relative magnification of 1 μm. FIG. 3B is a SEM image of the thermally converted version of the 3D, substantially pure carbon structure at the same magnification as FIG. 3B (1 μm). It appears that the carbonized structure has retained its log pile formation albeit at a much reduced size.

FIG. 4 shows a table of the comparative measurements of the 3D, carbon-containing 3D structure (TPP) created by TPP and the resulting carbonized 3D structure (TPP after carbon). Referring to FIG. 4, the overall footprint of the structures shrank from 1.5 mm in diameter to 0.25 mm in diameter. The individual block dimensions shrank from about 90 μm to about 13 μm. The feature sizes also shrank after carbonization: the line width shrank from about 500-600 nm to about 220 nm and the pitch shrank from 2.7 μm to about 440 nm.

Figure 5A:
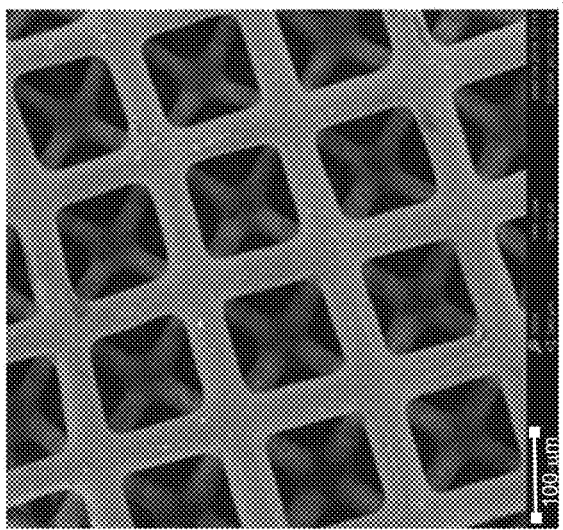
FIG. 5A is a scanning electron micrograph of a 3D, carbon-containing polymer part created by PμSL printing according to one embodiment.
Figure 5B:
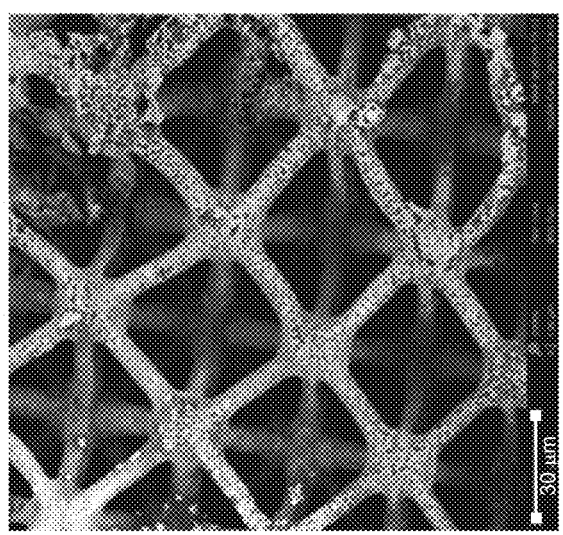
FIG. 5B is a scanning electron micrograph of a 3D, substantially pure carbon structure according to one embodiment.
Figure 5C:
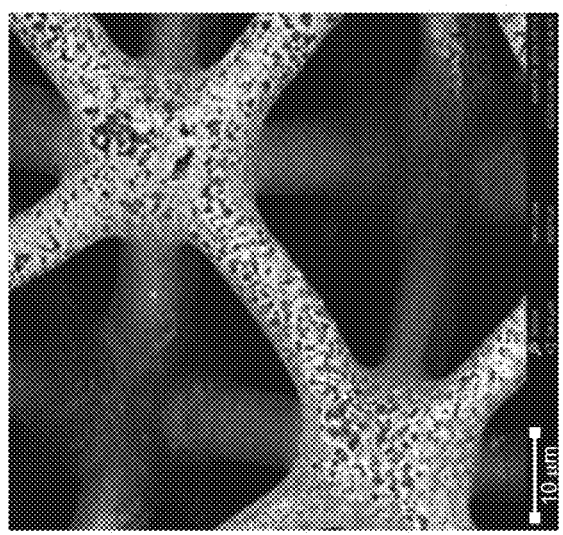
FIG. 5C is a scanning electron micrograph of a 3D, substantially pure carbon structure according to one embodiment.
Figure 7A:
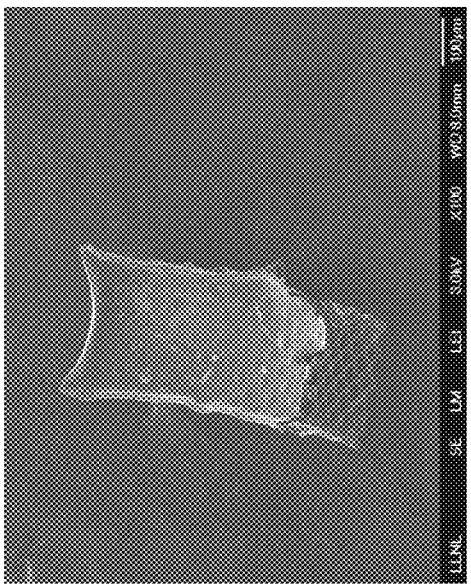
FIGS. 7A-7D are scanning electron micrographs of a 3D, substantially pure carbon structure according to one embodiment.
Figure 7B:
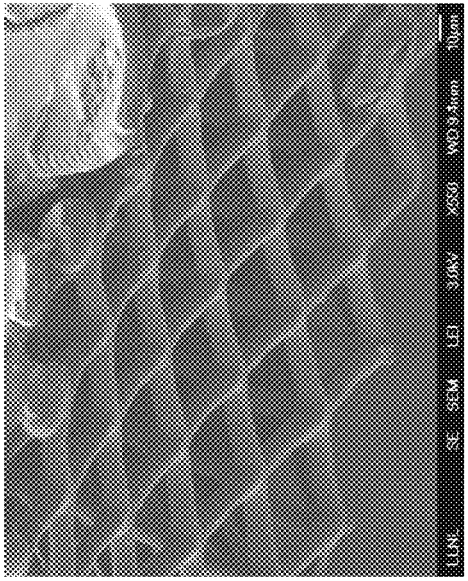
Figure 7C:
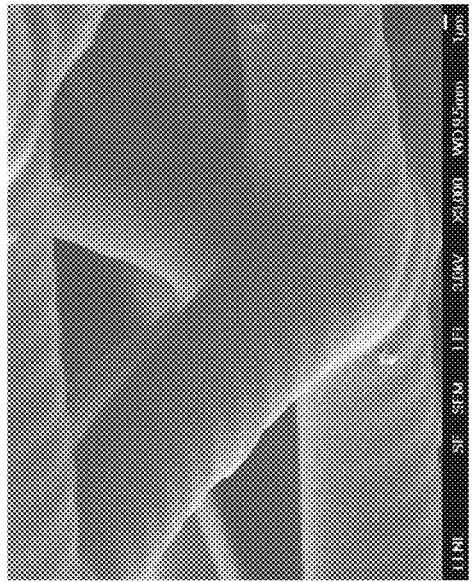
Figure 7D:
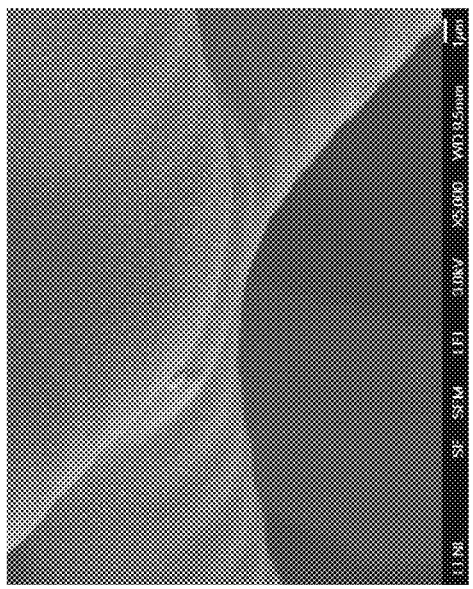

A 3D, carbon-containing polymer octet truss created with PEGDA polymer and using PμSL printing is illustrated in FIG. 5A (SEM scale bar 100 μm). Following carbonization, the 3D, substantially pure carbon octet truss is shown in FIGS. 5B-C. The scale bars in the SEMs shown in FIG. 5B and FIG. 5C are 30 μm and 10 μm, respectively.

FIG. 6 shovers a table of the comparative measurements of the 3D, carbon-containing 3D octet truss structure (PμSL) created with PEGDA polymer and PμSL printing and the resulting carbonized 3D octet truss structure (PμSL after carbon). Referring to FIG. 6, after carbonization, the dimensions of the PμSL octet truss shrank from 1.7×0.8 mm to 0.47×0.25 mm. The line width shrank from bout 43 μm to about 6 μm. The unit cell shrank from about 105 μm to about 35 μm.

A 3D substantially pure carbon octet truss created with PEGDA polymer by PμSL printing followed by carbonization using the method described herein is illustrated in FIGS. 7A-7D The scale bars in the SEMs shown in FIGS. 7A-7D are 100 μm, 10 μm, 1 μm, and 1 μm respectively.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
a substantially pure carbon three dimensional printed structure having an average feature diameter of less than about 100 nm, wherein the structure has features arranged in a geometric pattern, wherein a largest average distance between adjacent features is greater than an actual average diameter of the features, wherein the substantially pure carbon three dimensional printed structure comprises at least 95% carbon.

2. The product of claim 1, wherein the substantially pure carbon three dimensional printed structure has at least one of an edge and a diameter of at least 1 mm in length.

3. The product of claim 1, wherein the substantially pure carbon three dimensional printed structure has at least one of an edge and a diameter of at least 1 cm in length.

4. The product of claim 1, wherein the substantially pure carbon three dimensional printed structure is electrically conductive.

5. The product of claim 1, wherein the three dimensional printed structure is an octet truss.

6. The product of claim 1, wherein the features are located at pre-defined locations in the three dimensional printed structure.

7. The product of claim 1, wherein the three dimensional printed structure is a template.

8. The product of claim 1, wherein the three dimensional printed structure is a template around which an aerogel is formed.

9. The product of claim 1, wherein at least some of the features in the geometric pattern are arranged in approximately regular intervals.

10. The product of claim 1, wherein the features of the structure include extruded lines.

11. The product of claim 10, wherein the extruded lines intersect one another at approximately regular intervals.

12. The product of claim 10, wherein a first group of the extruded lines are parallel to one another and arranged along a first direction, wherein a second group of the extruded lines are parallel to one another and arranged along a second direction that is different than the first direction, wherein extruded lines in the first group intersect the extruded lines in the second group at approximately regular intervals.

13. A method of forming the product of claim 1, the method comprising:
creating a three-dimensional, carbon-containing structure using an additive manufacturing technique; and
converting the three-dimensional, carbon-containing structure to the substantially pure carbon structure,
wherein the substantially pure carbon structure has the average feature diameter of less than about 100 nm.

14. The method of claim 13, wherein the substantially pure carbon structure has at least one of an edge and a diameter of at least 1 mm in length.

15. The method of claim 13, wherein the substantially pure carbon structure has at least one of an edge and a diameter of at least 1 cm in length.

16. The method of claim 13, wherein converting the three-dimensional, carbon-containing structure to the substantially pure carbon structure includes heating the three-dimensional, carbon-containing structure in a vacuum.

17. The method of claim 16, wherein the heating is performed in a sequence of steps, each step including an increasing heating rate and a holding period at a predefined temperature.

18. The method of claim 13, wherein converting the three-dimensional, carbon-containing structure to the substantially pure carbon structure includes heating the three-dimensional, carbon-containing structure in an inert atmosphere.

19. The method of claim 18, wherein the heating is performed in a sequence of steps, each step including an increasing heating rate and a holding period at a predefined temperature.

* * * * *